July 20, 1954  A. D. MUGNIER  2,683,969
FISHWAY APPARATUS

Filed May 8, 1953  5 Sheets-Sheet 1

INVENTOR
Alston D. Mugnier
BY Chapin & Neal
ATTORNEYS

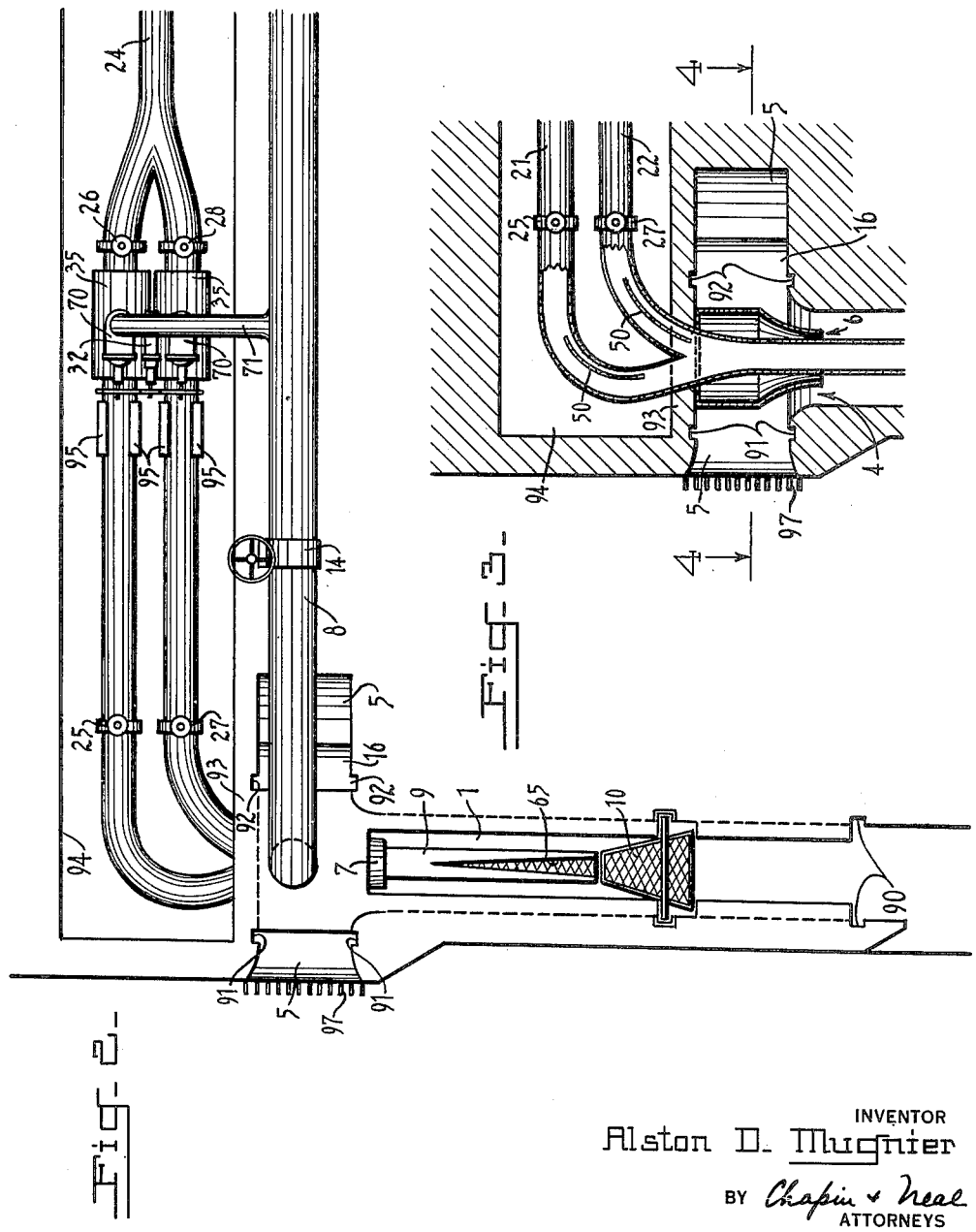

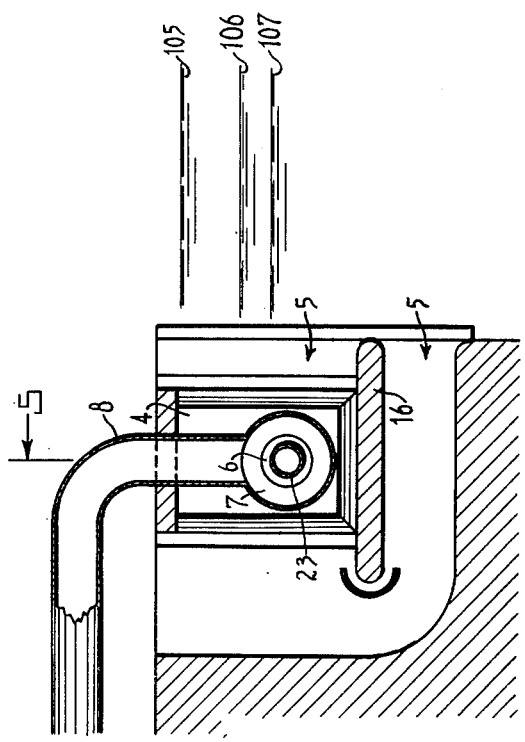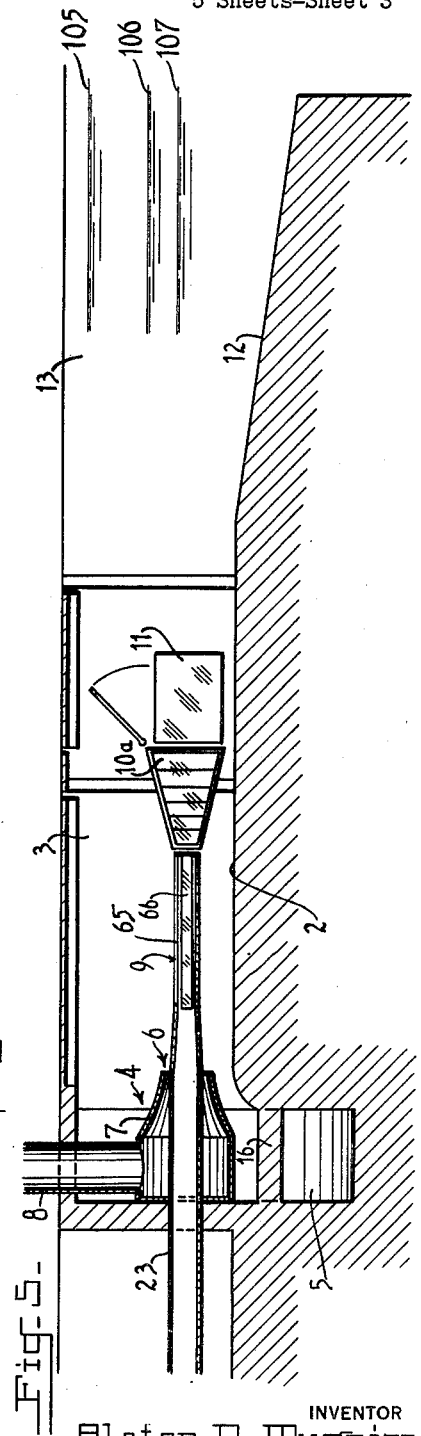

July 20, 1954　　　A. D. MUGNIER　　　2,683,969
FISHWAY APPARATUS
Filed May 8, 1953　　　　　　　　　　5 Sheets-Sheet 4
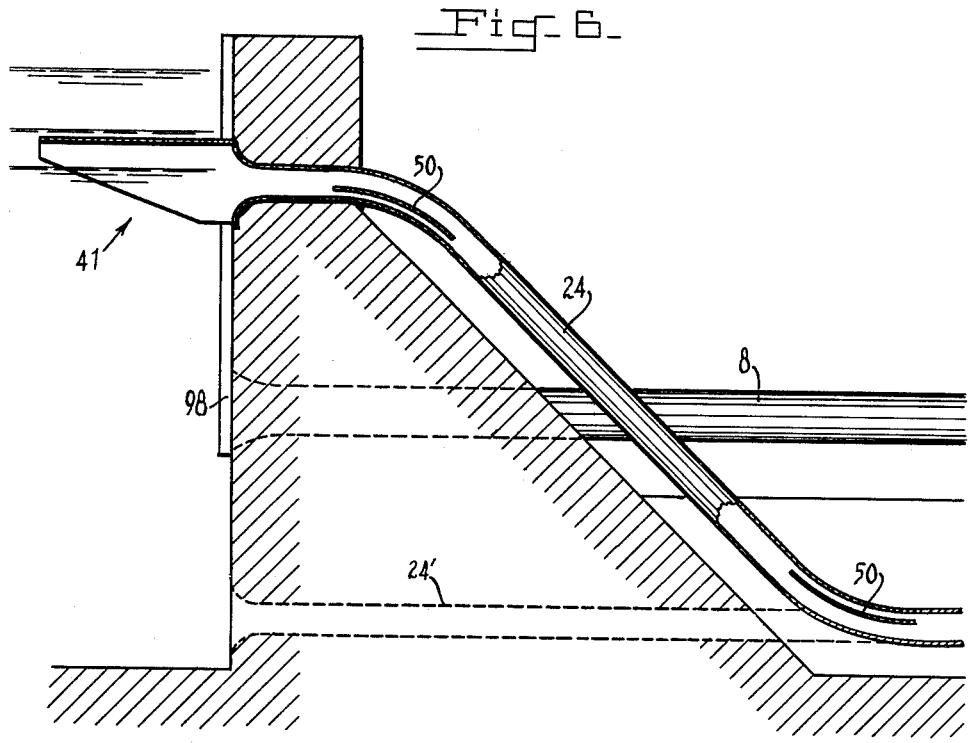
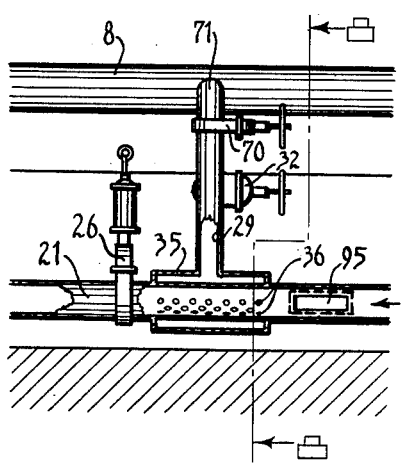
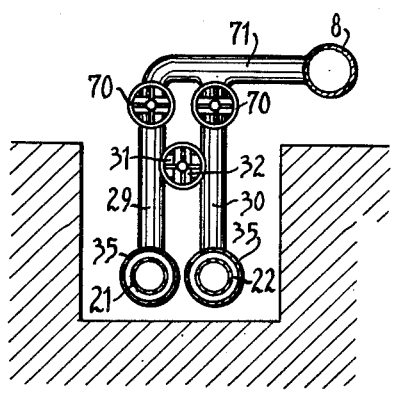
INVENTOR
Alston D. Mugnier
BY Chapin + Neal
ATTORNEYS

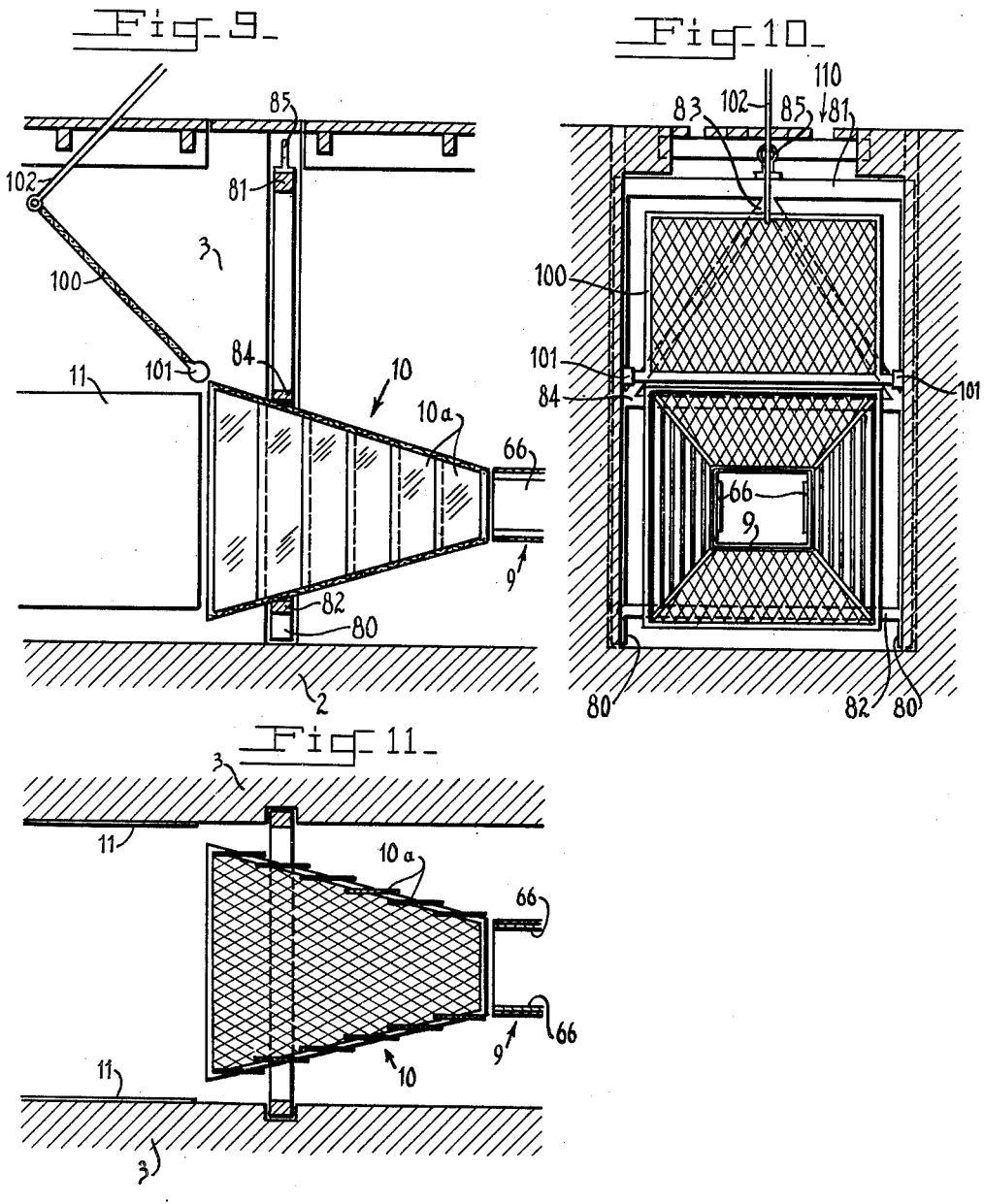

Patented July 20, 1954

2,683,969

UNITED STATES PATENT OFFICE 2,683,969

FISHWAY APPARATUS

Alston D. Mugnier, Granby, Mass.

Application May 8, 1953, Serial No. 353,761

18 Claims. (Cl. 61—21)

This invention relates to fishway constructions and a novel method for conducting migratory fish into the fishway for passage over a dam structure or other barrier and has for a general object to provide apparatus for satisfactorily attracting and causing migratory fish to move under their own power without the necessity of overcoming the forces of gravity and high velocity current, from the waters below a barrier across a river bed to the waters above and beyond the barrier.

A principal object of the invention is to provide apparatus for creating in the waters below a dam or other barrier controlled current conditions under which the migratory fish will be attracted from their natural environment in a more or less spacious river channel below a barrier into a shallow narrow enclosure where they may be controlled and despatched to the desired higher waters.

Another object of the invention is to provide, at the entrance to a shallow narrow enclosure for conducting fish upstream, apparatus which will create an artificial environment to which the fish will readily become accustomed and in which the fish will feel secure for further travel upstream.

More specifically the primary purposes of the present invention are to provide apparatus producing a current flow in the lower level of water to which the fish may become immediately oriented and which will induce an upstream progress into the narrow enclosure and subsequent confinement in a conduit leading to an upper level of water and to provide apparatus immediately in advance of the confining conduit which will gradually coax the fish thereto by creating an illusion of company with other fish leading to mass behavior and resulting self-convoyance and also the illusion of continuing vastness of space, and by gradually lessening the amount of light available to the fish at said entrance area thus simulating natural conditions and inducing the fish to proceed upstream.

Another object of the invention is to provide a novel pressure lock chamber system in the passage of the fishway for despatching the fish upstream.

Another object of the invention is to provide an hydraulically accurate swimway or path for the fish which at every section thereof minimizes any tendency of the water flowing therethrough to become excessively or unduly turbulent and thus react unfavorably on the fish swimming through the same.

Another object of the invention is to provide a fishway apparatus in which all the various conditions under which the fish are to travel may be regulated for creating gradual changes with respect to light, space, velocity and direction of current and pressure.

These and many other specific objects and advantages of the present invention will be best appreciated by the following description thereof taken in conjunction with the accompanying drawings showing an embodiment of the invention and in which, Fig. 1 is a perspective view of a new fishway installed on a dam structure;

Fig. 2 is a top plan view of the lower portion of the fishway duct and structure associated therewith to show novel features of construction;

Fig. 3 is a fragmentary horizontal sectional view at the "nozzle" end of the apparatus showing details of construction;

Fig. 4 is a sectional view on line 4—4 of Fig. 3;

Fig. 5 is a sectional view on line 5—5 of Fig. 4;

Fig. 6 is a side elevational view with parts in section of the fishway at the exit end of the structure;

Fig. 7 is a side elevation with parts cut away and showing details of a lock chamber construction;

Fig. 8 is a view on line 8—8 of Fig. 7;

Fig. 9 is a vertical section on an enlarged scale of a preferred form of hoistable fish screen apparatus at the entrance of the swimway duct;

Fig. 10 is a face view from the front of the screen shown by Fig. 9; and

Fig. 11 is a horizontal section through the screen of Fig. 9.

Figure 1:
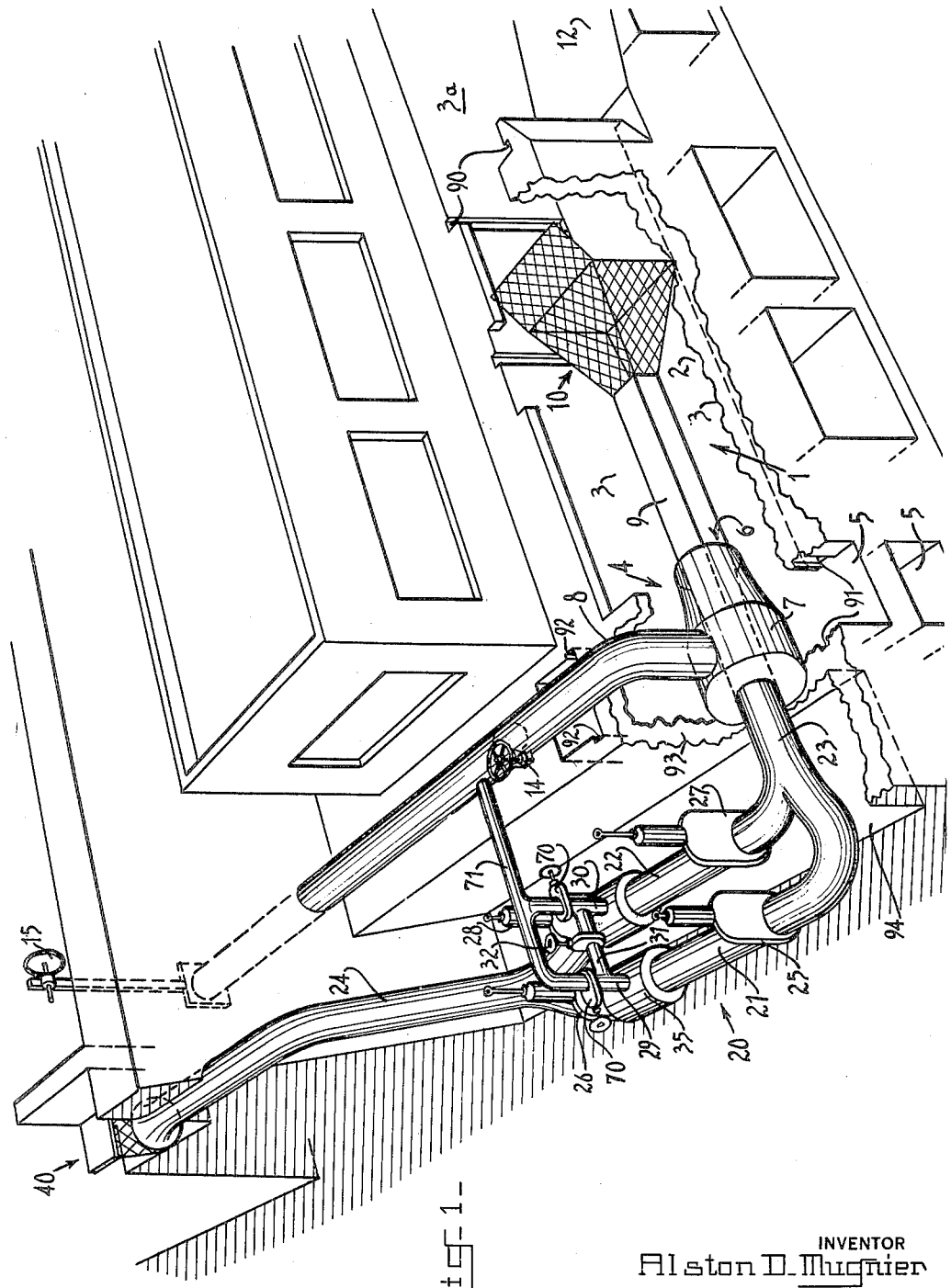

The passage of migratory fish into the apparatus from the lower level of the tail waters of a dam and through the swimway duct of the structure to the head waters of the dam will first be described more or less generally with reference to the drawings and the details and advantages of various features and modifications of the apparatus will be later described more specifically.

Of primary importance in the construction of the fishway is the provision of apparatus designed to attract the fish into the entrance of a duct through which they may be caused to move of their own volition and under their own power to the higher waters. I have found that by putting forth a large powerful horizontal jet of water into the waters below a barrier such as a dam an appropriate stimulus is provided for attraction of fish and that fish will become instantly oriented to such a jet so as to commence a vigorous upstream drive into the relative confinement of a simplified duct system such as is herein disclosed. This method which I have tested with successful results in an actual installation I have termed the "adducer jet" principle.

Referring to Fig. 1, the adducer jet apparatus at its inner end portion is formed in the present disclosure by a "nozzle" or channel passage 1 having a bottom wall 2 and side walls 3. The "nozzle" extends from an inner end section provided with a channel inlet port at 4 for water fed by circulation from the tail waters of the dam through a pair of recirculating inlet passages at 5. The port at 4 surrounds a restricted "injector" opening indicated at 6 of a chambered jacket 7 into which water under pressure from the head water level is fed from a power flow duct 8. The jacket 7 surrounds a lower leg portion 9 of the fish swimway duct. The leg 9 extends longitudinally of the nozzle channel 1 and is formed to provide an inner shading chamber as will be described. The leg 9 abuts the inner end of a pyramidally formed fish screen 10 at the outer section of the channel 1. The screen, as shown in the form of Figs. 9–11 inclusive, is preferably formed with the sides thereof comprising mirror surfaced overlapping slats 10a and beyond the open end of the screen is a panel mirror 11 along each side wall 3 at the outlet of the nozzle. As will be described water flows from the passage 4, from the opening 6 of the jacket and through the lower leg 9 to the exit of channel 1 to form an adducer jet flow.

Referring again to Fig. 1 the outer side wall 3 remote from the power plant foundation terminates beyond the mirrored section of the side walls while the inner wall 3 is extended beyond the mirrors along the face of foundation wall 3a of the power plant. The wall 3a may extend as much as a hundred feet or more depending upon the physical characteristics of a particular installation and width of the river. For the purpose of more easily attracting fish from a river channel the jet wall is preferably linearly extended transversely of the river channel at the upper end of the tail water and is free of any recessed or projecting portions against which undue turbulence or excessive eddying flows of water might be created by the adducer jet of water issuing from the channel 1.

It will be noted from Figs. 1 and 5 that the floor of channel 1 is extended beyond the end thereof as at 12 and thus forms a sloping apron of gradually increasing depth into the lower waters indicated at 13. The end of the apron may be, for example, at a depth of approximately eight feet below the surface of the normal tail water level although under various river bed conditions the depth may be less. The primary consideration is to create conditions of a jet flow of water under which no abrupt changes such as a depth of water or velocity or direction of flow are produced in the characteristics of the current flowing from the mouth of the channel and into the channel waters. Thus the migrating fish on entering the tail waters and on sensing the existence of the adducer current will become oriented for the passage upstream and without sensing any abrupt changes in current or disturbances which would otherwise warn the fish of unusual circumstances in an upstream passage.

The adducer jet flow projected horizontally from channel 1 is created by the flow of water from three different sources. A power flow is received in the chamber of jacket 7 from the duct 8 and controlled by a butterfly or other suitable type of valve 14 (Fig. 1). The supply for the power flow may be taken as shown from the higher level of water above the dam. At its inlet end the duct 8 may be provided with an emergency shut off valve as shown at 15. Water flows from the restricted mouth at 6 of the jacket 7 and draws with it by displacement the water circulated from the tail waters to the passage at 4. The upper passage 5 (Fig. 1) is in communication with the inner end of channel 1 past the outer side of the jacket 7. The lower passage 5 is in communication with the inner end of channel 1 at the inner side of the jacket, a horizontal divider wall 16 (Fig. 4) guiding the recirculating water under the upper passage below the jacket 7 and upwardly to the inner side of the jacket. Thus the injector flow from the restricted opening 6 will draw the water from the recirculating passages to augment the flow from the inner inlet end of channel 1.

In the lower leg 9 (Fig. 1) flow of water is received from the pressure lock system of the swimway to issue from the entrance mouth of the leg 9 centrally of the screen. The flow of water from the leg 9 is normally of greater force than the flow of water surrounding it or may be so regulated so that the approaching fish will be attracted to the central portion of the screen for passage into a shading chamber formed in the leg 9 as will be described.

The fish entering the swimway duct leg 9 find passage therein past the position of the injector jacket 7 into the pressure lock system indicated generally by the numeral 20. As shown by Fig. 1 the pressure lock assembly is herein shown as formed by two pressure locks at 21 and 22 forming an intermediate leg in the swimway duct system and each being connected to a common inlet passage at the downstream inner ends thereof as at 23 and to a common outlet at the upstream outer ends thereof as to the upper leg 24 of the swimway.

The pressure lock chambers are formed in each intermediate leg between spaced gate valves and an interchange by-pass conduit is connected between the locks adjacent the upper valves thereof. A gate valve to regulate the interchange flow is also located in said interchange conduit. The valves for lock 21 are the outlet valve at 25 and the inlet valve at 26. The corresponding valves for lock 22 are at 27 and 28. The interchange conduit is formed by a leg 29 extending from lock 21, a leg 30 extending from lock 22, and a cross over pipe 31 joining the legs and provided with a gate valve at 32.

The connection of each of the legs 29 and 30 to the lock chambers is formed by cylindrical jackets 35 of enlarged cross section and coaxially enclosing the adjacent pipe sections of the locks, as shown by Fig. 7. The annular chamber formed between the wall of the lock and the wall of the jacket is in communication with the interior lock chamber through perforations 36 in the lower portions of the lock wall. The jacketed wall portions of the lock chambers constitute "hover" chambers in each of the locks wherein fish may congregate as will be described while water flows downwardly from the interchange pipe and upwardly through the perforations into the lock chamber.

The lock chambers may be operated alternately for the passage of the fish up through to the upper leg 24 of the swimway. Referring again to Fig. 1 the locks are operated by opening the inlet and closing the outlet valve of one of the locks while closing the inlet and opening the outlet valve of the other lock. The interchange valve is opened to permit the flow of water at a desired rate from the open inlet valve of the first lock to the open outlet valve of the other lock by way of the interchange pipe and hover chambers. Thus, for example, with valves 25 and 28 closed and valves 26 and 27 open the flow of water is from valve 26 through the pipe 31 and up through the perforations of the hover chamber of lock 22 into lock 22 and out valve 27 to the common duct at 23. The fish will swim against the current in lock 22 until reaching the hover chamber 35 where the closed gate 28 will cause interruption of progress. As soon as fish in sufficient numbers congregate in the hover chamber or have remained in the hover chamber for a sufficient period of time, the condition of the lock chamber valves is reversed so that the fish detained in one lock may proceed to the upper leg 24 of the swimway and the fish entering the lower leg of the swimway may proceed into the other lock. That is to say in the example given where fish have collected in lock chamber 22, valves 28 and 25 are then opened and valves 26 and 27 are closed. Thus the passage is clear for access to leg 24 from lock 22 and the flow of water is reversed through the interchange pipe 31 to lock 21 and out valve 25 to the common entrance 23. Fish in the duct 23 will accordingly swim against the controlled current leading into lock 21. Preferably as shown the pressure lock conduits are horizontally disposed with the approach thereto and exit from the same hydraulically correct. The locks from end to end are of uniform cross sectional dimensions with the gate valves of a standard type completely unblocking passage therethrough so as to cause no pockets or undue turbulence.

At the exit of the upper leg 24, the flow of water being adjustable through the lock valves above described, the fish are directed into the head waters of the dam. My experiments with a full size model indicate that the leg 24 may be directed upwardly at an angle of as much as 45° to the top of the dam where a counting station at 40 may be located to observe the number and species of fish passing through the fishway. The openings of the inlet valves to the lock chambers may be regulated to limit the velocity of flow in leg 24 to suit the type of fish passing through the same. The leg 24 may also be directed horizontally as indicated at 24'. The exit from leg 24 at the top of the dam may be provided with a hooded arrangement as shown at 41 by Fig. 6 to enable the fish to make their exit from the darkness of the duct 24 gradually into the light of the head waters and while allowing the fish to choose its own depth of travel before emerging from the shaded area. The gradual transition from darkness to light at the exit of the fishway is of importance in order to condition the fish to the upstream waters and prevent any abrupt change which might adversely affect the fish and cause them to return downstream. The transition from the light of the atmosphere at the screened entrance end of the swimway and into the darkness of the swimway duct is also of prime importance and will be described presently.

I have established by considerable research that fish are equipped with the necessary sensory organs to enable them in an environment of complete darkness to become oriented to a current, to gauge the current velocity and to avoid objectionable contact with solid surfaces. While based in part on theory it is believed that the lateral line system sensory organs of a fish can translate the vibrations of fluid turbulence to form an ecological factor in the well being of fish and thus pressure differentials can be read by the fish so as to enable navigation without benefit of eyesight. Accordingly in the swimway duct disturbing factors creating undue turbulence and eddies should be minimized or eliminated to avoid confusing or alarming the fish and destroying the desire for upstream progress.

In order to assist the orderly and undisturbed progress of the fish to and through the fishway an all forward flow of water is thus highly desirable. The horizontally directed adducer jet flow in the channel 1 and from the same, as previously described, is formed to have a minimum of lateral components of velocity and to reach out into the river channel with a maximum of longitudinal velocity consistent with the conditions found in a particular locale. In the fish path or swimway itself at the entrance section of the channel 1, the screen 10 is formed with the mirrored slats at the sides thereof set edgewise to the direction of flow of water to minimize turbulence or eddying factors. And to counteract the tendency of the water to eddy in passing corner sections of the ducts it should also be noted that in the corner passages as in Figs. 3 and 6 deflector vanes as at 50 are located to eliminate eddying currents and to cause the least possible deterrence to the calm forward progress of the fish. In addition (Figs. 1 and 6) the exit end of the upper leg 24 is bell mouthed thus causing the entering water to hug the wall surfaces of the duct. The swimway duct as will be noted is a substantially uniform cross sectional area from exit to entrance with gradual transitions provided from section to section for an all forward flow of current. Thus with precisely controlled velocities of water the fish are coaxed to go upstream.

An hydraulically correct curvature at the corners and bends of the swimway and entrance structure eliminating hydraulic "separation" permits the fish when led out of their natural environment into the artificial enclosure to enter and traverse the fishway under their own power and according to their own conscious or unconscious desires or instinct efficiently and economically.

In being persuaded to enter the relatively narrow confinement of the swimway duct itself the fish have also been found to respond favorably to an artificially created environment presenting an illusion of vastness. Thus an adverse reaction is avoided which might otherwise affect the fish psychologically and cause a retreat from the entrance to the duct. The entrance screen with articulated laterally spaced and overlapping mirror elements at the sides thereof causes no turbulent eddies and adds no sudden noise factor adversely affecting the fish. A steady vibrational sound of water passing the screen may be noted which, to a fish approaching the same, is of gradually increasing intensity and thus unobjectionable. The mirrors 11 in advance of the screen are approximately six feet beyond the screen and in the greater cross sectional area of the channel 1 will create the illusion of the fish being in the company with other fish and in schools. It is known that fish will act more calmly in schools and as the sides of the screen are gradually brought together toward the entrance inlet to duct 9 the fish are coaxed forwardly by the urge to seek the main pilot current flow from the swimway duct leg 9 and with the visual aspect of a vastly larger channel. Thus the fish will be gradually conditioned to a smaller passage than they would otherwise tolerate under natural conditions.

The neutralizing of the fishes' aversion for constricted quarters by the use of mirrors is accompanied also by provision for neutralizing an aversion to sudden and abrupt changes in the degree of light experienced in any given environment. Thus the channel 1 in conjunction with the lower leg 9 may be utilized to provide a "shading" chamber means for gradually decreasing the light available to the fish until it reaches the total darkness at the inner end of the duct leg 9 leading to the lock chambers. Across the top edges of the side wall 3 of the channel 1 wood planks may be appropriately located (as shown by Fig. 10 as indicated by the arrow 110) to support either a solid or a slatted roof or hood so that the light permitted entrance to the inner section of the channel will gradually approach the total darkness of the inner part of duct leg 9. Further as shown by Fig. 2, the duct leg 9 may be formed with an adjustable elongated triangular screened opening as at 65 in the top thereof for gradually reducing the light available to the inner passage. As indicated in Fig. 5 the inner side walls of the duct leg 9 are also provided with reflector surfaces as the mirror 66 (see also Figs. 9 and 10). The mirrors 66 extend as far as the inner end of the triangular opening to continue the illusion of space until complete darkness is encountered within the duct. As indicated by Fig. 5 the mirrored portion of the leg is rectangular in cross section gradually merging into a cylindrical or tubular section adjacent the jacket. This outer end portion is of substantially the same cross sectional area and suitably accommodates the reflecting surfaces.

It has been mentioned that the flow of current from the lower leg 9 is designed to be of greater velocity than the flow of the surrounding current of the injector and recirculating waters passing through the screen. Ordinarily the pilot flow through the pressure lock system to the entrance will be sufficient to equal or be greater than that supplied by the power flow of duct 8 through the channel 1. However, it may be desirable to increase the pilot flow in either of the swimway locks and through the leg 9. This may be done by supplementing the flow through the same by opening a booster valve 70 in either leg 29 or 30 above the interchange pipe 31. The legs 29 and 30 are connected to the power flow duct 8 by a cross-over pipe 71 and the velocity through either of the legs may thus be increased to make the pilot flow in the ducts more attractive to the migrating fish. This permits flexibility of operation to control and adjust the apparatus under varying conditions such as the water level of the head and tail waters and the migratory habits of different species of fish. The velocity of water flowing from the duct leg 9 should be greater at the center of the duct end and outwardly thereof decreasing uniformly to the outer extremities of the water-filled cross sectional area. Thus the fish are normally attracted to the duct entrance.

In the drawings the various additional features of a preferred embodiment of the invention are illustrated. In Fig. 1 stop log grooves 90 are found at opposite sides of the exit end of nozzle 1 for receiving a log barrier to exclude the tail waters from the nozzle chamber for inspection, maintenance and repair purposes. For the same purposes stop log grooves 91 are provided for a barrier across the upper recirculation passage 5 so as to block the flow of water into the nozzle channel 1. At the other side of the jacket 7 stop log grooves 92 may receive a barrier to block the entrance of the lower recirculating passage 5 to the inner side of the jacket (see also Figs. 2 and 3).

A bulkhead 93 (Figs. 1, 2 and 3) separates the tail water passages from the pit 94 in which the lock chambers are located. The pit 94 is preferably dry at all times and may be covered by an appropriate canopy during periods when the fishway is not in operation. Access to the various valves may be easily had during operation and it will be understood that the lock chamber valves 25, 26, 27 and 28 may be power operated by appropriate mechanism and regulated in their opening and closing sequence by suitable automatically timed apparatus according to the needs of the particular fishway operations during the periods of operation.

In Figs. 2 and 7 window panels 95 are indicated on the downstream side of the lock inlet valves adjacent the hover chambers and in each side wall of the lock chambers. The panels 95 may be covered when not being used and afford inspection of the number of fish congregating in the hover chambers and permit observation of their activity on being blocked from further passage upstream. Thus by observation the "hovering" period before opening an outlet valve can be determined for the most efficient operation of the fishway. I have determined that if migratory fish become alarmed for any reason the urge to continue upstream may vanish and thus the hovering period if unduly prolonged could react unfavorably and induce the fish to return downstream. The hover chamber as previously noted is provided with perforations in the lower portion thereof. The perforations admit the flow of water in small jets the individual force of which is quickly dissipated to provide a current flow merely causing the fish to hesitate in its forward passage and without being urged to follow the source of the flow from the interchange duct leg above the chamber.

Against the entrance of trash or floating debris into the fishway passages, the recirculating passages 5 may be provided with a series of closely spaced vertical slats as indicated at 97 in Figs. 2 and 3. A similar slatted entrance at the inlet to the power flow duct 8 may be provided as indicated by the board at 98 in Fig. 6.

Such small trash as may enter will go through the system harmlessly. The perforations of the hover chambers are flushed by the reversible flow feature through the interchange pipe 31 and at the nozzle end the screen 10 is spaced slightly from the bottom and sides of the channel 1 (see Fig. 10) and may be hoisted upwardly from the channel for thorough cleaning or repair if necessary. As shown by Figs. 9 and 10 the screen is supported in a frame having side bars 80, slidable in the grooved sides of the channel, and connected by top and bottom bars 81 and 82. The screen is seated on the lower bar 82 and held at the top by an intermediate frame bar 84. Angle braces 83 extend between the ends of the bar 84 and the central portion of the top bar 81. A lift hook 85 is mounted on the top bar 81 for attachment of suitable lifting means.

By Figs. 9 and 10 there is also shown a tilting screen 100 pivoted on its lower edge between the channel walls as at 101 forwardly adjacent the top edge of screen 10. The tilting screen may be raised and lowered as desired by a lever 102 and may be used to prevent fish from swimming over the top of screen 10 when the tail water level in the chamber of channel 1 is excessively high. Under high water level conditions it will also keep floating debris from passing directly over the entrance to screen 10.

It will be noted that the duct leg 9 and channel are submerged or partially so at all times, the horizontal position thereof with respect to a high, intermediate and low water level in the lower waters, being shown by Figs. 4 and 5 at 105, 106, and 107 respectively. The relatively simple restricted duct system is thus available at all times for the passage of fish without elaborate measures being necessary to accommodate water at various levels.

What is claimed is:

1. In fishway apparatus having an open ended swimway formed by a restricted duct leading from the waters below a barrier to the upper waters above the barrier, a lower entrance end portion of said duct horizontally disposed and submerged in said lower waters with the upper exit end thereof being submerged in the upper waters to receive a continuous flow of water thereto with means in said duct to regulate the flow of water through said duct to the lower end thereof, a channel enclosing said lower end portion of the duct and extending at its outlet end beyond said duct entrance, said channel having at its inner end an inlet port communicating with a source of water under pressure with means to regulate the flow of water into said channel and at the outer channel end provided with a continuation of the bottom surface thereof extending outwardly into the main body of said lower waters at a gradually increased depth from the channel mouth, whereby the flow of water from said duct and the inlet end of the channel may be regulated to extend in a combined forward stream into the lower waters for the attraction of fish to said restricted duct, and screening means between the lower entrance end of said duct and the sides of said channel for guiding fish to the duct from the outer end of the channel.

2. The fishway structure of claim 1 including mirror surfaced means at the sides of the channel and at the sides of said screening means facing inwardly to create the illusion of company and an illusion of vastness of space to induce self-convoyance of fish approaching and traversing the duct entrance past the outer section of said channel.

3. The fishway structure of claim 1 including mirror surfaced means at the sides of the channel and at the sides of said screening means facing inwardly to create an illusion of vastness of space to fish approaching the duct entrance past the outer section of said channel, and means for progressively shading said outer section of the channel and regulating the amount of light entering the area of said duct entrance.

4. In fishway apparatus for conducting migratory fish over a barrier from water at a lower level to water at a higher level, an open ended duct having an exit end submerged in the higher waters and a lower entrance end submerged in the lower waters and valved pressure lock means for regulating the flow of water through the duct, a channeled passage having side and bottom wall surfaces extending in parallel relation longitudinally of the lower end portion of the duct and beyond said open entrance thereof said duct being centrally positioned in said channel with the inner channel end provided with an inlet port thereto encasing the adjacent portion of the duct, a conduit communicating with said port having means to conduct a flow of water thereto for passing through said channel, said channel at the entrance end of the duct having a pyramidally formed screen with the larger end spaced forwardly of the entrance and the smaller end adjacent the edges thereof to lead the fish into said entrance, said channel at its outer end being directed into said lower level of waters and having its bottom surface extending a substantial distance at a gradually increasing depth therein.

5. In fishway apparatus for conducting migrating fish from the lower waters below a barrier in a stream to the upper waters above the barrier, a swimway duct of narrow confined and substantially uniform cross sectional dimensions throughout with the upper exit end thereof submerged in said upper waters and the lower entrance end portion horizontally submerged in said lower waters, said duct having a lower horizontal leg portion, an intermediate horizontal leg portion and an upper leg portion, with said intermediate leg portion being provided with spaced gate means forming a pressure lock chamber for regulating the flow of water through the duct and admitting fish to and from said intermediate leg, conduit means communicating with said chamber adjacent the upstream end thereof to conduct water through the intermediate leg from the upper to the lower leg upon closing either of said spaced gate means, and means associated with said lower leg to form a current of water externally of the duct at its entrance end including a channeled passage surrounding said duct entrance portion and having an outlet end outwardly spaced therefrom submerged in said lower waters of the barrier, means at the inner end of the channel to conduct a flow of water longitudinally of said duct and past the entrance thereof to combine with a flow of water from said duct, means mounted in the channel outwardly adjacent said entrance to lead fish into said duct including reflecting surfaces arranged at each side of said channel, said channel having shading means to limit the light available to the channel area adjacent said duct inlet, and said duct at its exit end having shading means for gradually increasing the amount of light available to fish emerging therefrom.

6. In fishway apparatus for conducting migratory fish from the lower waters below a barrier in a stream to the upper waters above the barrier, a swimway duct of narrow confined cross sectional dimensions throughout with the upper exit end thereof submerged in said upper waters and the lower inlet end portion horizontally submerged in said lower waters, said duct having an upper, a lower and an intermediate leg portion, said intermediate leg portion being provided with a pair of spaced tubular conduits horizontally disposed with each conduit being connected to said upper and lower leg portions, an interchange pipe connecting said conduits at the upstream ends thereof and spaced gates located in each conduit with said interchange pipe connection being located adjacent the uppermost gates on the downstream side thereof, said tubular conduits having perforations in the lower wall portions thereof for the passage of water between said conduits and said interchange pipe, said interchange pipe being operable to bypass water from one conduit to the other upon the alternate closing and opening of the upper and lower gates of said conduits.

7. The structure of claim 6 with said interchange pipe having a valved booster conduit connected thereto at its outlet end and communicating at its inlet end with the waters above said barrier.

8. In fishway apparatus, an open ended fishway duct with an entrance end submerged in the waters below a barrier, an exit end submerged in the waters above the barrier, spaced gate valves in the duct forming a pressure lock system for alternate operation of the gates to permit the passage of fish to the exit end of the duct, and means to regulate a continuous flow of water from the exit to the entrance end of the duct; adducer flow means at the entrance end portion of the duct to attract fish thereto with a channeled passage surrounding said end portion and having a floor surface extending beyond the channel sides at a gradually increasing depth into the lower waters below the barrier, submerged circulating water passages at the inner end of said channel having ports leading to said channel around said duct, an injector jacket annularly surrounding said duct with its outlet end directed inwardly of the channel, and a power flow conduit communicating with said jacket and receiving a supply of water under pressure from the waters above the barrier.

9. In fishway apparatus for conducting migratory fish over a barrier from water at a lower level to water at a higher level, an open ended duct having an exit end submerged in the higher water and the entrance end portion horizontally disposed and submerged in the lower water and gate means forming a pressure lock system to regulate the flow of water therethrough, means at said entrance end portion of the duct for inducing fish to enter said duct from the waters of the lower level, said means comprising a channel of substantially uniform cross section throughout its length and encasing said entrance end portion of the duct in parallel axial relation therewith, said channel extending beyond the end of the duct with the outer end of the channel being directed transversely of said lower waters, the bottom surface of said channel having an extension of gradually increasing depth into said waters and terminating a substantial distance from the channel mouth, the inner end of said channel having a channel inlet port surrounding the adjacent section of the duct and conduit means connected between said port and the waters of said higher level to create a flow of water in said channel past the open end of said duct, and screening means adjacent said open end of the duct to limit the upstream passage of fish in the channel to the open entrance end of said duct.

10. In fishway apparatus for conducting migratory fish over a dam from a lower level of water to a higher water level, a swimway duct having the walls thereof formed with substantially continuous longitiudinal surfaces for passage of the fish comprising an upper section having an exit communicating with the water at the higher level, a lower section having an entrance communicating with the water of the lower level and an intermediate section joining said end sections with said sections being of substantially the same cross sectional dimension and shape and said intermediate section being provided with spaced gate valves therein forming lower and upper pressure lock barriers in said intermediate section, means operable on closing either of the barriers and opening the other to bypass water from said upper section to the lower section through the intermediate section and around said closed barrier, said lower section of the duct having at its entrance end a pyramidally formed screened member flaring outwardly and forwardly of the end edges of the duct, and a channeled passage formed to enclose the entrance end portion of the duct and said flared entrance with the latter being removably mounted in said channel, the outer end of said channel being directed into the lower level of water, the inner end of said channel having conduit means connected with said higher level of water for conducting a flow of water into the channel and through said screened member at said entrance end of the duct to mingle with said duct flow.

11. In fishway apparatus for conducting migratory fish over a dam from a lower level of water to a higher level, an open ended duct of substantially uniform cross sectional area from inlet to outlet having its exit end in the waters of the higher level and its entrance end in the waters of the lower level, valve mechanism in said duct to regulate the flow of water through said duct and a channel having a passage of substantially greater cross section than said duct encasing the lower entrance portion of said duct longitudinally thereof and extending outwardly beyond the opening of said end, said channel having means at the inner end thereof for conducting a flow of water into the passage along the outer walls of said end portion of the duct, said channel having an outlet end submerged in the water of the lower level and a floor surface longitudinally extending beyond said outlet end into said lower waters, said floor surface being of gradually increasing depth in said lower waters and terminating a substantial distance outwardly of said channel outlet, and means for screening the waters passing through the channel around the opening of said entrance end of the duct and extending from the end edges thereof to the sides and bottom of said channel passage.

12. In fishway construction for leading fish over a dam, in combination, an open ended duct with an upper section having an exit end submerged in the higher waters above the dam, a lower section having an entrance end submerged in the lower waters below the dam, an intermediate section connecting said end sections and provided with spaced gate valves to regulate the flow of water through said duct, and adducer jet means to attract fish to the entrance of said duct, said jet means comprising a channel passage having the sides and bottom thereof spaced from the walls of said lower section of the duct and extending beyond the open end of the same, said channel having an outlet end having a cross sectional dimension at least equal to the cross sectional dimension of the remainder of said channel and an extension of the bottom surface outwardly directed therefrom and of gradually increasing depth in the lower waters of the dam, said extended surface terminating a substantial distance into the body of lower water, the inner end of said channel having an inlet port, and a conduit connected thereto and communicating with the water above said dam for supplying water under pressure to said channel, the water from said inlet port and said duct mingling at the open end of said duct to flow as a jet out into the body of said lower waters for attracting fish thereto, the surface of the water comprising said jet being substantially at the same level as the surface of the adjacent said low water at their confluence, and screened means in said channel passage providing a pyramidally formed approach to said entrance end of the duct from said channel outlet section.

13. In fishway apparatus having an open ended fishway duct provided with pressure lock means for conducting migratory fish from lower waters below a dam to the waters above the dam and means for providing a continuous flow of water through the duct, adducer jet means for creating a substantial flow of water into the main body of the stream below said dam and attracting fish to the entrance of said duct, said adducer means comprising a channeled nozzle passage with side and bottom walls enclosing the entrance end portion of said duct and having the walls thereof in spaced substantially parallel relation therewith with the bottom wall extending beyond the laterally spaced side walls of the channel at a gradually increased depth in the lower waters below the dam, said duct and channel being submerged in said lower waters and at the inner end of the nozzle passage having a jacketed chamber provided with an annularly disposed opening directed inwardly of the passage, a valved conduit communicating with said chamber and receiving a flow of water under pressure from above the dam for supplying said channel, said channel at its inner end having circulating passages leading from the waters below the dam with outlet ports adjacent said jacketed chamber whereby the flow from said jacket may be augmented by water supplied through said circulating passages for passing through said channel and past said entrance end of the duct.

14. The structure of claim 13 with means to screen the waters passing the duct entrance and lead fish thereto, said means including a plurality of slats having their inner sides provided with mirror surfaces and arranged in outwardly stepped overlapping relation from each side of said open end of the duct, and mirror surfaces at the sides of said channeled passage outwardly adjacent said screening means.

15. Fishway apparatus for conducting migratory fish in a stream below a dam structure to the waters above the dam and comprising in combination, an open ended duct forming a restricted swimway for the fish and provided with an upper section having an exit end submerged in the water above the dam, an intermediate section with spaced gate valves forming a pressure lock system in said swimway and means for by-passing each of said gate valves, and a lower section having an entrance end portion thereof horizontally disposed and submerged in the lower waters of the dam; an adducer jet nozzle means at said lower end of the duct for attracting fish thereto from said stream and comprising a channeled passage surrounding said entrance end portion of the duct and extending beyond the latter for directing a substantial flow of water from the channel into the main body of lower waters below the dam, said passage having its walls substantially parallel with the walls of said duct with the bottom wall of the channel extending beyond the sides thereof at a gradually increasing depth into said lower waters, and a valved power flow conduit with an inlet end submerged in the waters above the dam and an outlet end formed as a jacket around said duct and provided with an annular opening at the inner end of the channel passage, said channel at its inner end having passages communicating with the waters below the dam for augmenting the flow of water from said jacket; a screening entrance member of pyramidal form extending between said duct walls at its entrance end and the walls of said passage, the sides of said entrance comprising a plurality of overlapping laterally spaced slatted members having mirror surfaces at the inner sides thereof, the sides of said channel passage having mirror surfaces beyond said screened entrance, said duct adjacent its entrance end having the top wall thereof formed with a screened opening of inwardly decreasing width and the adjacent interior side walls provided with mirror surfaces to form a shading chamber of increasing darkness inwardly of said duct swimway, and hooded means at the exit end of said swimway duct above the dam gradually increasing the amount of light available to the fish emerging from said exit.

16. In fishway apparatus for conducting migrating fish in a stream below a dam structure to the waters above the dam, a restricted swimway for the fish comprising an open ended duct having a lower entrance portion submerged in the waters below the dam, an upper exit end submerged in the waters above the dam and intermediate the end portions a pair of lock chamber sections each having an inlet and an outlet in communication with said upper and lower portions, spaced gates defining said lock chambers with an interchange pipe connecting said chambers adjacent the gates at the upper outlet ends thereof, said lock chambers being provided with perforated wall portions for the passage of water to and from said interchange pipe, a channel formed at the lower end portion of said duct having side and bottom walls submerged in the waters below the dam and spaced from the adjacent side and bottom walls of the duct and extending therebeyond, said channel having an open end facing the stream below said dam with reflecting surfaces on the side walls adjacent said open entrance end of the duct and a pyramidally formed fish screen entrance to said open duct entrance, the sides of said screen entrance comprising a plurality of laterally spaced overlapping slat members having reflecting surfaces at their inner sides, the top wall portion at the entrance end of said duct having a screened opening of progressively narrowing width from the end edge thereof inwardly of the duct and the interior side wall surfaces of the duct having reflecting surfaces extending substantially the length of said top opening to form an inner shading means for gradually reducing the amount of light received in said duct, said channel being formed with its inner end spaced from the entrance end of the duct and provided with an inlet port surrounding said duct and passages therefrom communicating with the waters below the dam, and a jacket member having a restricted outlet passage annularly disposed around said duct with an inlet pipe conduit in communication with said upstream water above the dam, said conduit also having a valved connector pipe communicating with each of said lock chambers and a valve in said conduit for regulating the flow of water to said duct jacket, the side and bottom walls of said channel being substantially parallel with said end portion of the restricted swimway duct with the lateral enclosure of said side walls terminating in outwardly spaced relation to said open entrance end of the duct and said bottom wall extending therebeyond at a gradually increasing depth in said downstream waters.

17. The method of attracting migratory fish from a lower level of water below a dam structure to the confinement of a narrow shallow duct providing a fish swimway to the upstream waters above the dam by the flow of water therethrough from said upstream water which consists in submerging the lower end portion at the entrance end of the duct on a horizontal plane in the lower waters of the dam and directly the flow of water from the mouth thereof into the upper end of the main body of water below the dam, externally of said duct producing and directing a current of water longitudinally of said duct and parallel to the direction of flow from the duct in surrounding relationship thereto and past the said entrance end to mingle with said duct flow, regulating the two currents to produce a velocity of flow from the duct at least equal to the velocity of the external flow and a combined flow sufficient to extend a substantial distance into the main body of water at the lower level, confining said combined flow to an all forward direction of current outwardly of the inlet end of the duct and screening the confined waters of the externally produced flow surrounding said inlet end of the duct to lead migrating fish into the current at the entrance to said duct.

18. The method of claim 17 with the additional step of arranging reflectors at the sides of said entrance to the duct to create an illusion of company and vastness of space to fish approaching said duct inlet to induce self-convoyance of said fish.

References Cited in the file of this patent

UNITED STATES PATENTS

| Number | Name | Date |
| --- | --- | --- |
| 1,082,109 | Collar | Dec. 23, 1913 |
| 1,380,384 | Howard | June 7, 1921 |

FOREIGN PATENTS

| Number | Country | Date |
| --- | --- | --- |
| 37,583 | Germany | of 1886 |